United States Patent
Milne (10) Patent No.: US 9,342,636 B2
(45) Date of Patent: May 17, 2016

(54) METHOD AND APPARATUS FOR SIMULATION BY DISCRETE ELEMENT MODELING AND SUPPORTING CUSTOMISABLE PARTICLE PROPERTIES

(75) Inventor: Andrew Milne, Edinburgh (GB)

(73) Assignee: DEM SOLUTIONS LTD, Edinburgh (GB)

( * ) Notice: Subject to any disclaimer, the term of this patent is extended or adjusted under 35 U.S.C. 154(b) by 2033 days.

(21) Appl. No.: 12/191,127

(22) Filed: Aug. 13, 2008

(65) Prior Publication Data

US 2010/0042386 A1 Feb. 18, 2010

(51) Int. Cl.
G06G 7/48 (2006.01)
G06F 17/50 (2006.01)

(52) U.S. Cl.
CPC ........ G06F 17/5018 (2013.01); *G06F 2217/16* (2013.01)

(58) Field of Classification Search
CPC ............................ G06F 17/5018; G06F 2217/16
USPC .......................................................... 703/6, 7
See application file for complete search history.

(56) References Cited

U.S. PATENT DOCUMENTS

| | | | | |
|---|---|---|---|---|
| 5,960,446 A * | 9/1999 | Schmuck et al. | ............. | 707/610 |
| 7,447,614 B2 * | 11/2008 | Ghaboussi et al. | ................ | 703/2 |
| 2005/0066301 A1 * | 3/2005 | Lorenz et al. | ................... | 716/20 |
| 2005/0137856 A1 * | 6/2005 | Cencini et al. | .................. | 704/10 |
| 2006/0005228 A1 * | 1/2006 | Matsuda | ........................... | 726/1 |
| 2006/0235908 A1 * | 10/2006 | Armangau et al. | ........... | 707/204 |
| 2007/0124128 A1 * | 5/2007 | Connacher et al. | ............. | 703/11 |
| 2007/0143034 A1 * | 6/2007 | Sakaguchi | ....................... | 702/26 |
| 2007/0174029 A1 * | 7/2007 | Seko et al. | ......................... | 703/6 |
| 2007/0174032 A1 * | 7/2007 | Tillman et al. | .................. | 703/22 |
| 2007/0219765 A1 * | 9/2007 | Calvert et al. | ..................... | 703/6 |
| 2007/0261535 A1 * | 11/2007 | Sherwani et al. | ............... | 84/609 |

OTHER PUBLICATIONS

"Prediction of Creep Stiffness of Asphalt Mixture with Micromechanical Finite-Element and Discrete-Element Models", Dai et al., Feb. 2007, Journal of Engineering Mechanics.*

(Continued)

*Primary Examiner* — Kamini S Shah
*Assistant Examiner* — Cedric D Johnson
(74) *Attorney, Agent, or Firm* — Park, Vaughan, Fleming & Dowler LLP; Laxman Sahasrabuddhe (57) ABSTRACT

One embodiment of the invention provides a computer-implemented simulation system for discrete element modeling. The system comprises discrete elements corresponding to objects or particles, each particle having a predefined set of properties. The system further has an interface for receiving at least one behaviour model for applying to the particles, and for receiving from the at least one model, one or more custom properties for the particles. In response to receiving a custom property, the system extends the discrete elements to contain both the predefined set of properties and the custom property for the particles. The system performs a simulation by applying the at least one behaviour model to the particles and updating values of the predefined and custom properties. The values of the custom particle properties are stored with the default particle property values and can be analysed and visualised in the same way as the default property values.

18 Claims, 7 Drawing Sheets

(56) References Cited

OTHER PUBLICATIONS

Markauskas, D. "Discrete Element Modeling of Complex Axisymmetrical Particle Flow", Dec. 23, 2006, Mechanika, 2006, Nr. 6 (62).*

Lu, Ning et al., "A Discrete Element Model for Kaolinite Aggregate Formation During Sedimentation", Jun. 20, 2007, International Journal for Numerical and Analytical Methods in Geomechanics, John Wiley & Sons, Ltd.*

* cited by examiner

METHOD AND APPARATUS FOR SIMULATION BY DISCRETE ELEMENT MODELING AND SUPPORTING CUSTOMISABLE PARTICLE PROPERTIES

FIELD OF THE INVENTION

The present invention relates to simulation systems, and in particular to simulation systems based on discrete element modeling (DEM).

BACKGROUND OF THE INVENTION

Discrete element modeling (also referred to as discrete particle, distinct element, or distinct particle modeling) is used for simulating a wide range of physical, industrial, engineering and/or manufacturing processes and operations. The discrete elements, also referred to as particles, represent objects located in a three-dimensional space that interact dynamically with each other and their surroundings subject to specified physical models or heuristics. The physical interactions are often based on surface contact, although other forces, such as electromagnetic field effects and/or fluid drag, may also be involved. The particles are often defined as being of finite (non-zero) size, but may in some simulations be treated as point objects.

Discrete element modeling allows for the simulation, analysis and visualization of particulate flows, and is able to provide high-resolution information on properties such as particle kinematics, momentum, heat and mass transfer in bulk particle deformation and flow. It is used in a wide range of scientific and technological industries, for example pharmaceutical, chemical, mineral and materials processing as well as oil & gas production, agricultural and construction and geo-technical engineering, in order to design, develop and test products and processes faster and more accurately, thereby reducing development costs and time to market.

Examples of particle behaviours that may be simulated and hence better understood via discrete element modeling include: the handling and transport of materials on and between conveyors, the filling and emptying of hoppers, the mixing and blending of powders and fluids, particle segregation, the mining and excavation by machine of soil and rock, the coating of tablets and pellets, the operation of dry powder inhalers, etc In fact, the great diversity of applications for discrete element modeling has caused problems due to the need to accommodate a wide range of physical models, each having its own properties and parameters for the individual particles. Thus it can be difficult and time-consuming for a standard discrete element modeling system to be used if the particle properties and attributes for the desired simulation differ from the default set provided in the standard modeling system. For example, in some applications, the temperature of the particles plus heat transfer between the particles and their surroundings (and each other) is of significant interest; however, particle temperature may not be relevant for other simulations. Existing systems have limited flexibility for coping with the proliferation of potential applications for discrete element modeling.

SUMMARY OF THE INVENTION

One embodiment of the invention provides a computer-implemented simulation method for discrete element modeling. The method comprises providing a plurality of discrete elements, each corresponding to a particle, each having a predefined set of properties. The method further comprises receiving at least one behaviour model for applying to the particles, the behaviour model including one or more custom properties for the particles. In response to receipt of the custom properties, the method further comprises extending the discrete elements to contain both the predefined set of properties and the custom properties for the particles. The method further comprises performing a simulation using discrete element modeling by applying the behaviour model to the particles and updating accordingly values of the predefined and custom properties.

This approach offers increased flexibility, scope and ease-of-use compared with existing systems, and provides a platform which can be readily extended by users with customisable particle properties to cover a wide range of particle simulations for discrete element modeling. The custom properties can be seamlessly integrated into, and subsequently analysed in conjunction with, the existing predefined particle properties.

The invention further provides an apparatus and computer program and computer readable medium containing such a program for implementing such a method.

BRIEF DESCRIPTION OF THE DRAWINGS

Various embodiments of the invention will now be described in detail by way of example only with reference to the following drawings.

DETAILED DESCRIPTION

Figure 1:
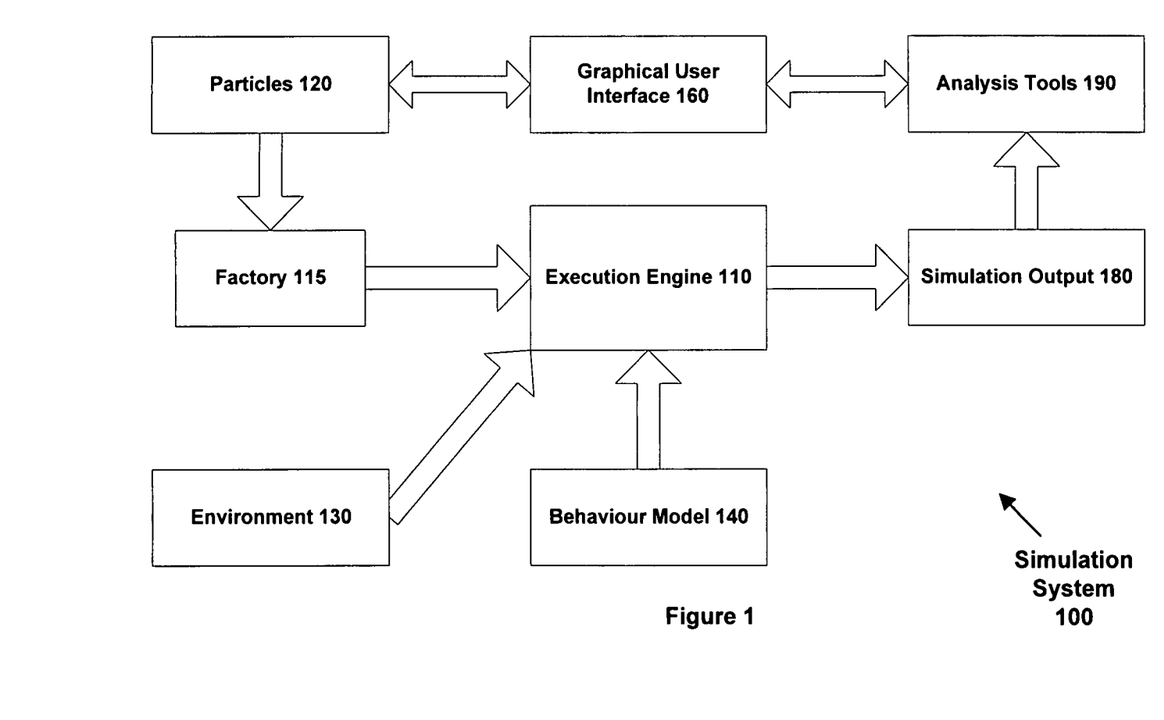
FIG. 1 is a schematic diagram showing the operation of a simulation system in accordance with one embodiment of the invention.

FIG. 1 is a schematic diagram showing the operation of a simulation system 100 in accordance with one embodiment of the invention. The simulation system is based on an execution engine 110 which takes as input:

(a) a set of particles 120 with properties, such as shape, size, etc. The properties typically specify physical attributes of the particles, as well as parameters for use in the simulation, such as residence time. The system supports multiple different types of particles in a single simulation.

(b) an environment 130 specifying the surroundings of the particles, including boundary conditions and geometry elements. The environment determines the presence of other objects with which the particles may interact and whose behaviour is controlled separately from the particles themselves. The environment may define (for example) the size and shape of a container holding the particles, any objects within the container, plus any operational movement (such as for a conveyor belt). The environment may also specify fluids or fields, such as electric or magnetic, with which the particles may interact, e.g. to exchange momentum, mass or energy; and (c) behaviour model 140 (also referred to as a physics model), which specifies the interactions of the particles (with each other and also with the surroundings as specified by the environment). One or more behaviour models 140 can be added as plug-ins to simulation system 100. Different behaviour models may apply to different interactions, e.g. particle-particle, particle-geometry, or particle-media. The interactions may result in the modification in some physical property of the particles, such as an exchange of momentum, mass or energy between the discrete elements, or between the discrete elements and their surroundings. An interaction may also change attributes of the discrete elements due to the operation of heuristics or other laws governing the interaction. For example, the presence of a particle in a particular location may change the value of an attribute such as color, a flag to indicate that the particle passed this way, the amount of time spent near a given surface, etc.

The simulation system includes one or more factories 115 which generate particle instances for use in the simulation corresponding to the template of particle properties and attributes. The factory initialises the inertial and dynamic conditions of each particle, including attributes such as size, shape, position, velocity etc.

The simulation system 100 also includes an execution engine (also referred to as the core solver) to determine the simulation outcome 180, based on the specified boundary conditions 130 and the behaviour model 140. This usually involves the execution engine performing many iterations to track particle behaviour with time.

The simulation system 100 further includes a graphical user interface (GUI) 160 and a range of analysis tools 190. The simulation output 180 can then be viewed and investigated via GUI 160 using analysis tools 190, to provide a better understanding of particle behaviour. For example GUI 160 may support a graphical representation showing the path of travel for a particle as the simulation progresses. In addition, the simulation output 180 can be exported for analysis elsewhere, or for input to a further simulation.

Simulation system 100 provides particles 120 with a predefined set of fixed properties, for example size. Simulation system 100 also supports the assignment of customised properties to particles 120 to supplement the fixed properties. A generic framework is provided to allow arbitrary user-defined properties (also referred to as attributes or tags) to be assigned to a particle (i.e. a discrete entity or element) in a DEM. These properties are utilised both during the simulation solution itself by execution engine 110, and are also available for use in post-processing operations for DEM simulations, such as by analysis tools 190. For example, the values of the custom particle properties are passed to the relevant behaviour model(s) for use in calculating particle interactions.

The assignment of customised properties to particles can be performed automatically by a behaviour model 140 within simulation system 100. In other words, a behaviour model may specify some additional customised properties for particles. These customised properties will normally (but do not necessarily) relate to physical parameters utilised in determining the interactions determined by the behaviour model. When the behaviour model 140 is plugged into the simulation system (e.g. via the relevant API), the simulation system automatically updates the definition of particles 120 to register the new customised properties for the behaviour model.

The simulation system therefore ensures that the customised properties from a given behaviour model 140 are associated with the particles 120 themselves (rather than being held in the behaviour model per se). This then allows these customised properties to be utilised in other behaviour models 140 on those particles, if so desired. For example, a contact model may result in a change in the value of a custom property (say electrostatic charge) following an interaction between two particles (or between a particle and an object), and this (changed) custom property value could then be used by a particle body force model (such as electrostatic attraction/repulsion).

Note that certain custom particle properties for a behaviour model may be optional, in that such a property will be used, if available, for calculating an interaction, but the interaction will still be calculated even if this property is not available. For example, a contact model between particles may account for the history of contact between the particles, but if no contact history information is available, the contact model will default to a formulation that is independent of contact history. The behaviour model may be configured not to register such (optional) property with the simulation system for automatic adding to the particle set.

Custom particle properties can also be added to particles 120 using GUI 160. This may be used, for example, to add properties to particles that are used on an optional basis by a given behaviour model (and hence are generally not added automatically to the simulation system by the behaviour model). The GUI 160 also supports the display and visualisation of the custom particle properties in the same (consistent) manner as fixed (predefined) user properties. For example, a particle may have a predefined system property of velocity, and a custom (user-defined) property of temperature. The GUI 160 allows a visualisation of particle temperature in the same manner as the default (built-in) particle property of velocity. Such a visualisation might be used, for example, to investigate where high temperature/high velocity particles are concentrated. It is therefore transparent to the user when performing an analysis whether a given particle property is fixed or user-defined (custom). Furthermore, the custom particle properties can be subject to data export in the same manner as fixed particle properties, for example, by serialisation into a data file. The simulation system also supports export into (and import from) XML files.

As described in more detail below, the custom particle properties are stored in a data file and are divided into two types: those added by behaviour models 140 (referred to as system properties), and those added by a user through GUI 160 (referred to as user properties). A custom particle property can be in one of two states:

Tentative: Tentative properties have not been used in the simulation yet, and no particle has a value for the property yet. In general tentative properties can be edited and changed without having any impact on the simulation. A user can change any aspect of a tentative user property, but tentative system properties can only have their initial value changed. (System and user properties are described in more detail below).

Finalised: Finalised properties have been used in the simulation and each particle will have a value associated with it. Finalised properties cannot be changed in any way.

The differentiation between tentative and finalised custom particle properties is used to restrict the operations a user can perform on the custom particle properties. GUI 160 allows a user to see the list of current properties and to make changes to existing tentative properties as well as to add or delete tentative user properties. However, a user cannot delete tentative system properties as these may be required for the selected behaviour model(s) to work. In addition, as finalised properties have already been added to the simulation data and the particles already possess values for them, a user is not allowed to make changes to a finalised property within a given simulation (for reasons of code optimisation).

As described above, simulation system 100 includes factories 115 for creating particle instances during a simulation. As with the fixed particle properties, a factory has a list of factory parameters, one for each custom property. The parameters allow a user to dictate the initial value of the corresponding properties for a particle created by the factory. For each parameter, the user can specify whether the initial value is set as: (a) a fixed (predefined) value, (ii) a random value, or (ii) taken from a normal distribution of values.

The support of customisable properties in simulation system 100 provides a generic capability which enables any relevant information to be associated with any discrete object in the particle-based simulations. This information can be used and dynamically updated during the course of a simulation. This enables the combining of particle-scale models for any physical phenomena of interest, e.g. heat transfer, mass transfer, chemical reactions, biological reactions, etc with particle dynamics simulation, and transforms a standard DEM solver into a platform for simulation of a wide range of phenomena at the particle-scale.

The custom property variables for use in a simulation are defined interactively by the user or specified automatically by a behaviour model. The custom properties can be used to represent any physical (or potentially non-physical) variable including, but not limited to, temperature, chemical concentration, residence time, charge, density, etc. During the simulation itself, the custom particle attributes are tracked in both the global and local particle coordinate frames, and can be used in combination with default (fixed) attributes. The custom attributes are available to any internal or externally loaded behaviour model, however attached to the core solver (e.g. via API, dedicated linkage, etc). In addition, the data for all the custom properties produced by the simulation are stored in the results file(s), and are available for analysis and visualization in post-processing operations including data export, binning, graphing and attribute coloring in visualization.

Figure 2:
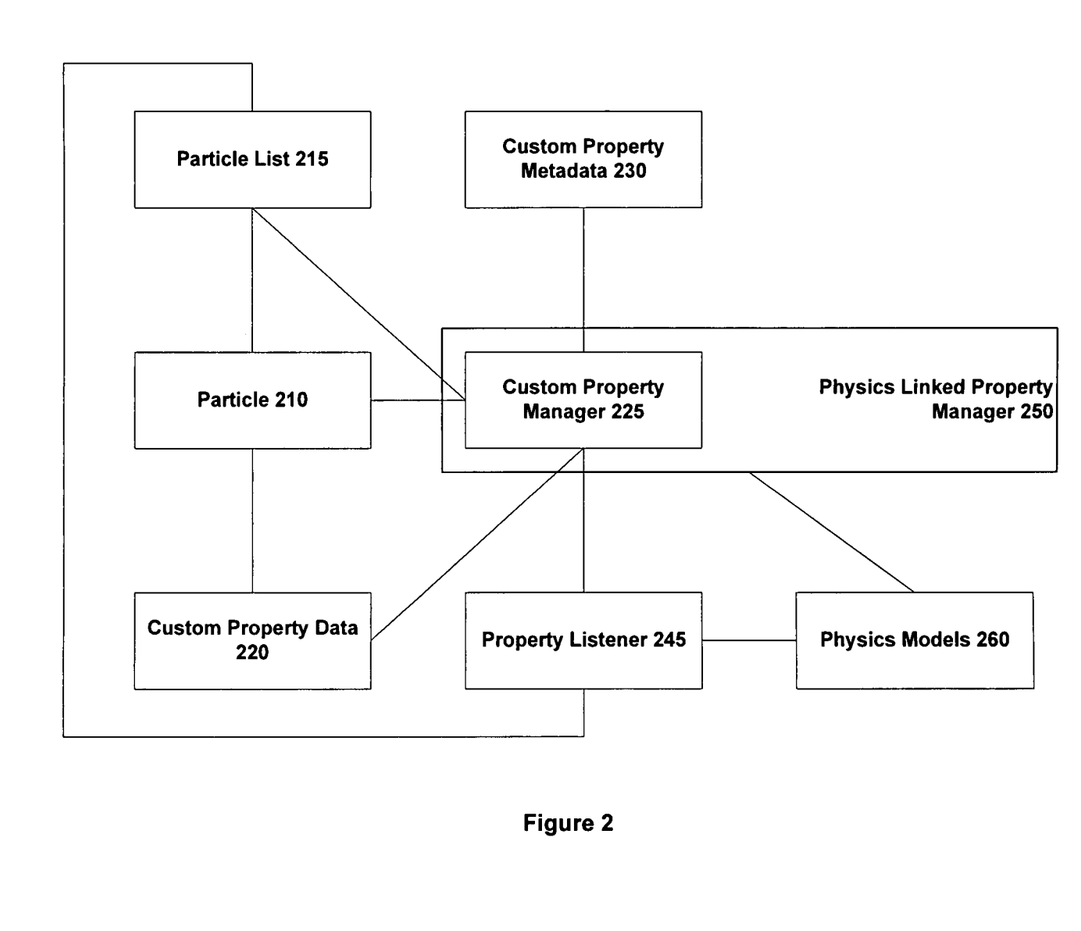
FIG. 2 is a schematic diagram showing certain components involved in a simulation system in accordance with one embodiment of the invention.

FIG. 2 illustrates some of the system components involved in the support of customisable properties for particles in accordance with one embodiment of the invention. It will be appreciated that other embodiments may have a very different structure depending upon the requirements of any given implementation.

The Custom Property Metadata 230 is used to specify in generic terms custom particle properties. For example, the particles in a simulation may have a surface coating, and the custom particle property might represent the depth of the coating. This property may be specified as including three values—the minimum depth, maximum depth, and average depth of the coating for the particle. (Alternatively, in another implementation each value could be arranged as its own custom property).

Table 1 lists information included in the Custom Property Metadata 230 in accordance with one embodiment of the invention. It can be seen that the Custom Property Metadata component 230 does not hold actual custom particle data for particles, but rather defines the general data structure(s) used to hold the customer particle data (as well as other ancillary information, such as the source or origin of the property in question).

TABLE 1

Custom Property Metadata attributes

Name of property
Data type of property -
in a current implementation only c++ double is supported for reasons of code optimisation, but other implementations may support additional (or different) data types
Number of elements -
so property may represent a list or linear array of the specified data type; e.g. position in space could be specified by list of 3 data elements representing three different coordinates
Property source -
property may be added directly by user or indirectly by contact model (the latter is referred to as a system property)
Reference count -
number of sources that utilise this property
Units (data units of property) -
e.g. as appropriate for a length, charge, etc
Initial value -
this is used when this property is added to an existing particle (but can be overridden for a particle which is newly generated with this property)
Offset -
specifies location of first element of this property in the properties array defined by the Custom Property Manager for finalised properties The Custom Property Manager 225 maintains a Custom Property Data listing 220 comprising finalised and tentative properties. The finalised properties are at the start of the listing followed by the tentative properties. The Custom Property Data listing 220 holds the actual values associated with the different finalised properties for a given particle. The custom property information is stored for each particle as a single flat array of doubles to allow fast reading/writing/querying of the property data within the simulation application. The values for the custom properties can be accessed from the listing either by the Name of the property or by the Offset, as defined in Table 1 above. Furthermore, the amount of data for each property in the Custom Property Data listing 220 can be determined from the Number of Elements and the Data Type, as defined in Table 1 above.

Some of the methods provided by the Custom Property Data 220 and the Custom Property Manager 225 are listed in Tables 2 and 3 respectively. Note that where appropriate, much of the functionality in these two Tables can be invoked either by property name or by the index position of the property in the Custom Property Data listing 220.

TABLE 2

Custom Property Data methods resize -
this method is used to resize the internal storage to match the current finalised properties list of the Custom Property Manager
getProperty -
gets a pointer to the first value of the specified property
writeXmlAttributes -
writes the property listing to the supplied XML element as attributes
serialize -
(de)serializes the property listing to/from a data file. The serialised format includes the length of the data followed by the data itself. When reading in data, it is possible for the length of data to be less than the list of properties (this will occur if new properties have been added in a later run of simulation, i.e. for subsequent time steps). In this case, the available data is entered, and the remaining properties are assigned their default values (see Table 1).

TABLE 3

Custom Property Manager methods addTentativeProperty -
this method is used to add a new custom property to the Custom Property
Metadata 230 (as a tentative property)
getNumberOfProperties -
returns number of properties (or just number of tentative properties or
finalised properties, depending on call parameter)
deleteTentativePropertyof -
this method is used to delete a property from the Custom Property
Metadata 230. Such deletion is only possible if the property is (i) a
tentative property, and (ii) a user (rather than a system) property
(as specified by Property Source).
incrementPropertyRefCount -
increments the reference count for the property (see Table 1). If the
property is a user property, it is converted to a system property.
decrementPropertyRefCount -
decrement the reference count for the property
deleteUnreferencedSystemProperties -
this deletes any tentative system properties that have a reference count of 0
(and which are therefore no longer required by any behaviour model). As
previously indicated, finalised properties cannot be removed or deleted,
even if their reference count is 0.
finaliseAllTentativeProperties
this converts all tentative properties to finalised properties, and informs
all Property Listener implementations accordingly (see below)

The Particle component 210 represents a particle, and owns an instance of the Custom Property Data listing 220 for that particle. In particular, the Particle component 210 includes a wrapper that provides a reference to the Custom Property Data listing 220. This allows the Particle component 210 to be a fixed (predetermined) size, even if the Custom Property Data listing 220 itself may vary in size from one simulation to another according to the number of custom properties involved.

The simulation system further includes a Property Listener 245 and a Physics Linked Property Manager 250. The Property Listener interface 245 is implemented by all those classes that are registered with the Custom Property Manager 225 so as to be informed of new finalised and tentative properties. The interface is used in particular by behaviour model(s) 140 in order to keep track of the particle properties involved in a given simulation. This allows a behaviour model to determine, for example, if certain optional properties (from the perspective of the behaviour model) are included in the simulation, as well as the order in which the various custom particle properties are stored.

The Property Listener interface 245 is also used by code in the Factories 115 to work out what custom properties exist and need to be handled by the factory system—e.g. assigned initial values, and options to configure those initial values presented to the user. Unlike behaviour models and the Particle list (see below) the Factory system needs to know about both tentative and finalised properties (to allow the user to perform any desired configuration).

The simulation system further includes a Particle list 215 which holds a listing of Particles 210. When new particle properties are finalised, each particle in the simulation has to be notified in order to resize its corresponding Custom Property Data (see Table 2). Rather than registering every individual particle with the Custom Property Manager 225, only the Particle list 215 needs to be registered. When the Particle list 215 is informed via the Property Listener 245 that new custom properties have been finalised, it iterates over all Particles 210 in the list. This then causes each Particle 210 to re-size its Custom Property Data as appropriate.

The Physics Models component 260 is responsible for loading and initialising the various behaviour models 140 (e.g. contact models, external force models, etc). The Physics Linked Property Manager 250 implements a listener interface and is therefore informed whenever there is a change in the loaded physics models 140 of the system—i.e. a new model added or an existing model removed. In the current implementation, the Physics Property Manager 250 derives from the Custom Property Manager 225, and so in effect performs the role of both (as indicated in FIG. 2).

Some of the methods provided by the Physics Linked Property Manager 250 are listed in Table 4 below. (The current implementation maintains certain distinctions between different types of physics models, such as contact model, external force, etc, that are not directly relevant to an understanding of the present invention, and accordingly such distinctions are omitted from Table 4).

TABLE 4

Physics Linked Property Manager allowPhysicsModel -
this method retrieves the list of required system properties from the
relevant physics model and checks that:
1) if the name, unit type and number of elements are the same for a new
property as for an existing property, it is assumed that these are the same
custom property, and accordingly the new behaviour model utilises
(shares) the existing property (and the physics model is allowed).
2) if the name for a new property is the same as for an existing property,
but the unit type and/or the number of elements is different, then an error
is raised (and the physics model is not allowed).
3) if the name for the new property is not the same as any existing
property, then the property can be added as a new entry.
physicsModelAdded -
this method updates the Custom Property Manager 225 with the properties
of the new physics model. It the property already exists, the reference
count for such a system property is incremented by one. If the property
does not already exist, it is added and its reference count is set to 1.
physicsModelRemoved -
this method retrieves the list of required system properties from the
relevant contact model. The property reference count for each relevant
system property is decremented by one. After all relevant system
properties have been removed (decremented), the
deleteUnreferencedSystemProperties method (see Table 3) is
invoked to remove any system properties that are no longer required.

The Physics Models instance 260 calls the allowPhysicsModel method of the Physics Linked Property Manager 250 to check if the new physics model to be added is allowed. If none of the properties of the new physics model conflicts with existing properties, the model can be added, and the physicsModelAdded method is called. Alternatively, if the allowPhysicsModel method results in an error, then the physicsModelAdded method is not called. The loading of a physics model is therefore atomic, in that either the model is loaded in its entirety, or else none of the model is loaded.

Figure 3:
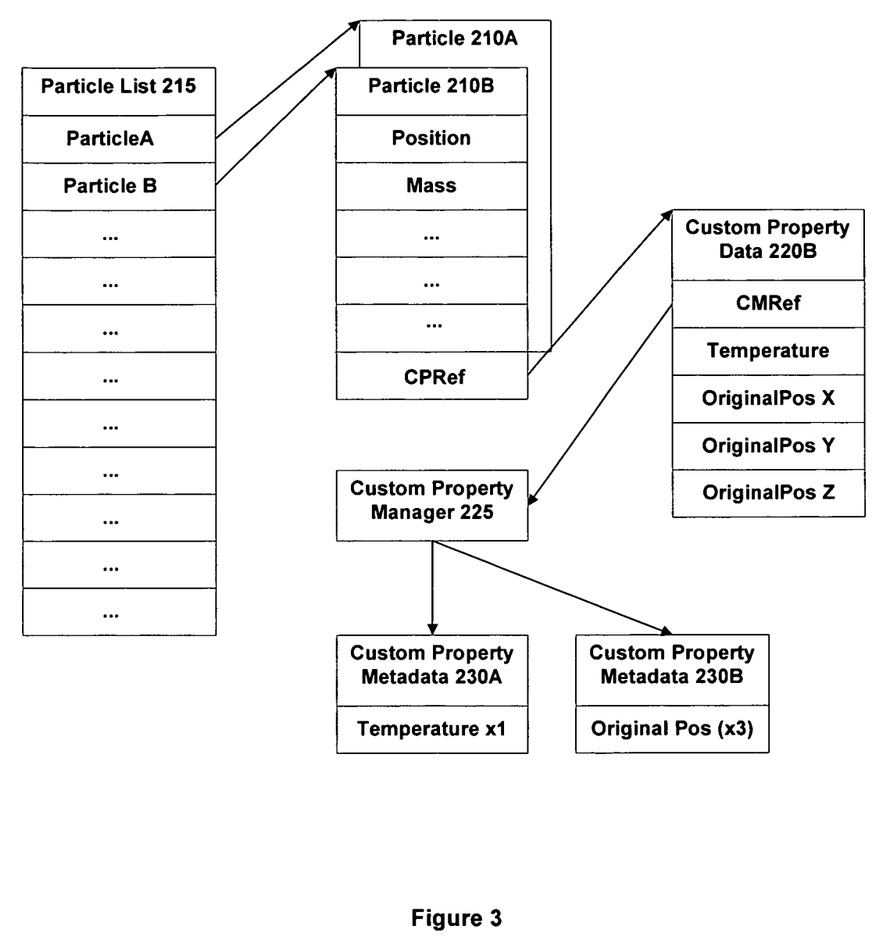
FIG. 3 is a schematic diagram showing in more detail the relationships between certain components of FIG. 2 in accordance with one embodiment of the invention.

FIG. 3 shows in more detail the interrelationships between certain components of FIG. 2 in accordance with one embodiment of the invention. The particle list 215 contains references to each of the particles (particle 210A, particle 210B, etc). Each particle includes a set of predetermined, fixed properties, such as position, mass, and so on, which are standard for all simulations. The values of such properties are stored in the particle component itself 210.

Each particle also includes a reference to the custom property data 220B for that particle. Note that custom property data 220 can be considered as a separate data set for each particle, although in some implementations, the data for all particles may be stored together in a single structure. The custom property data 220 includes a reference to the custom property manager 225 for that data, plus the values for the custom particle properties. In the example of FIG. 3, it is assumed that the custom particle properties comprise (a) temperature, and (b) original position (using 3 coordinates).

In order to interpret the data held in custom property data 220, the system follows the reference to the custom property manager 225, and from there to the custom property metadata 230. The metadata of each custom property is held separately, so that in the example of FIG. 3, a first set of custom property metadata 230A specifies the location of the temperature custom property, while a second set of custom property metadata 230B specifies the location of the original position custom property (having 3 elements). The custom property metadata 230 allows the values in the custom property data set 220 to be properly navigated.

Figure 4:
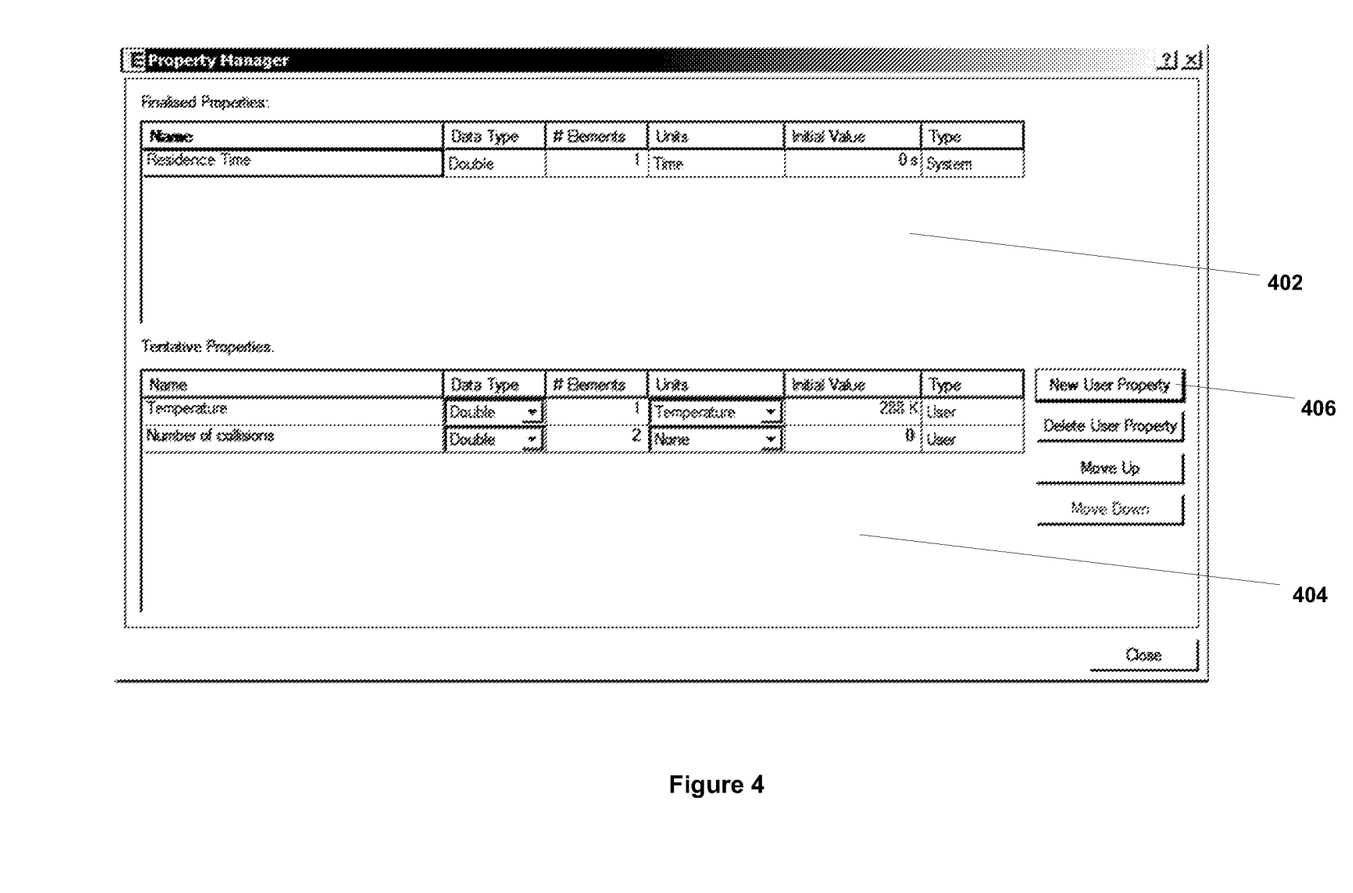
FIG. 4 is a screen shot illustrating a user interface that allows custom particle properties to be added or deleted in accordance with one embodiment of the invention.

As previously mentioned, the custom particle properties can be either system properties, if they are entered via a physics model 260, or a user property, if they are entered separately by the user (in effect by hand). FIG. 4 illustrates a screen provided by graphical user interface 160 to allow a user to enter such a custom particle property in accordance with one embodiment of the invention. In particular, FIG. 4 shows the screen divided into two portions, a top pane 402 for finalised properties, and a lower pane 404 for tentative properties. As already discussed, the user is only able to make changes to a property that is still in the tentative state (i.e. not yet finalised).

FIG. 4 includes multiple columns which correspond to the data elements of Table 1 for defining a custom particle property (with the exception of reference count and offset, which are internally-defined properties). When a user selects the New User Property button 410, a new entry is created in pane 404 (below the existing entries). The user is allowed to enter the data into the fields of the new custom user property. The user is also able to edit certain metadata values for a tentative property already present in pane 404. In particular, a user can change any aspect of a tentative user property, but tentative system properties can only have their initial value changed. (The source of a property is fixed and cannot be changed by a user, since this determines whether a given custom property is a user property or a system property). In addition, the screen of FIG. 4 also allows a user to delete a selected tentative property by activating the Delete User Property button, as well as to re-order the displayed properties.

The screen of FIG. 4 depicts one finalised custom property (Residence time) in pane 402 and two tentative custom properties (Temperature and Number of Collisions) in pane 404. Residence time is a system property, and so has been entered from a behaviour model. Temperature and Number of Collisions are user properties, and so have been entered by clicking on the "New User Property" button 406. As previously indicated, a user is able to modify the data associated with a tentative property in pane 404 (except for the Type), for example by clicking on one of the arrowheads shown in FIG. 4 associated with various data elements. This then provides the user with a list of possible selections. These arrowheads are omitted from the finalised properties in pane 402, since these finalised properties can no longer be edited.

Figure 5:
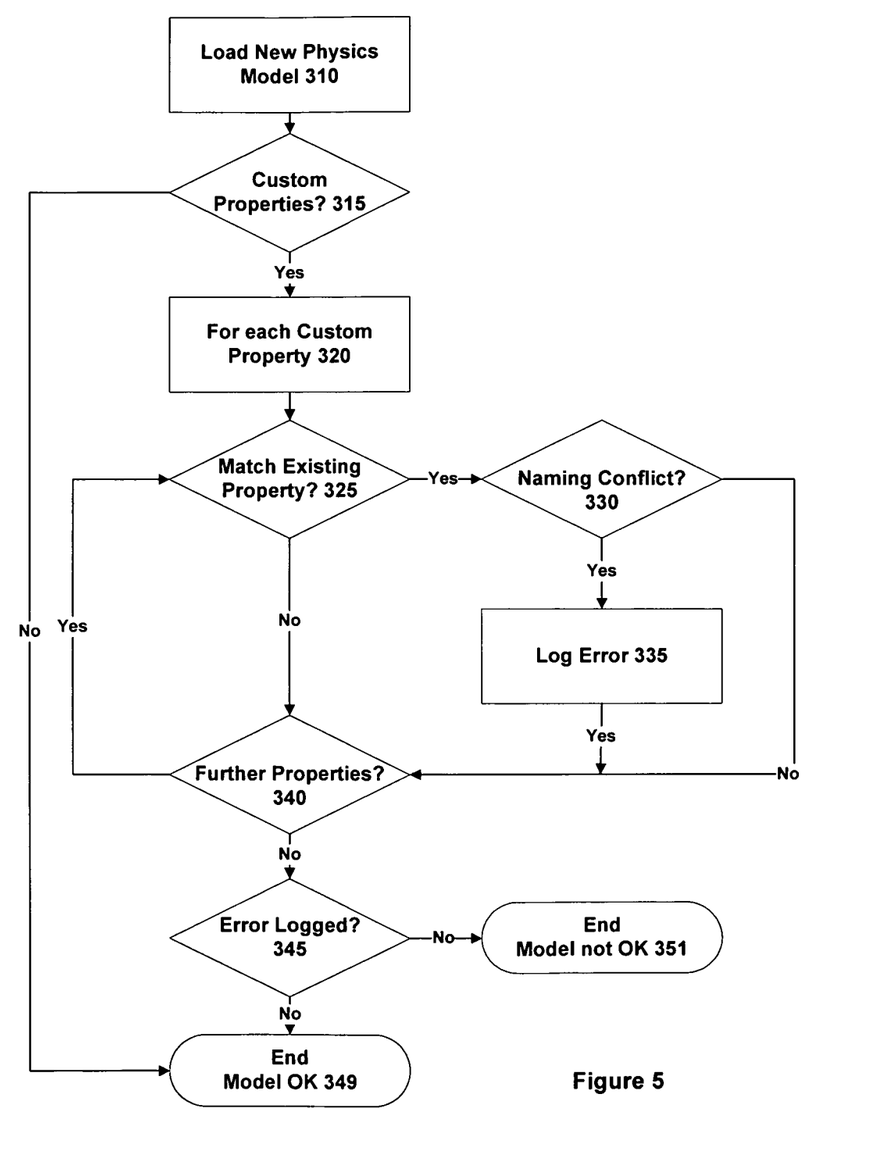
FIG. 5 is a flowchart showing certain aspects of checking whether a physics model can be added into the simulation system in accordance with one embodiment of the invention.
Figure 6:
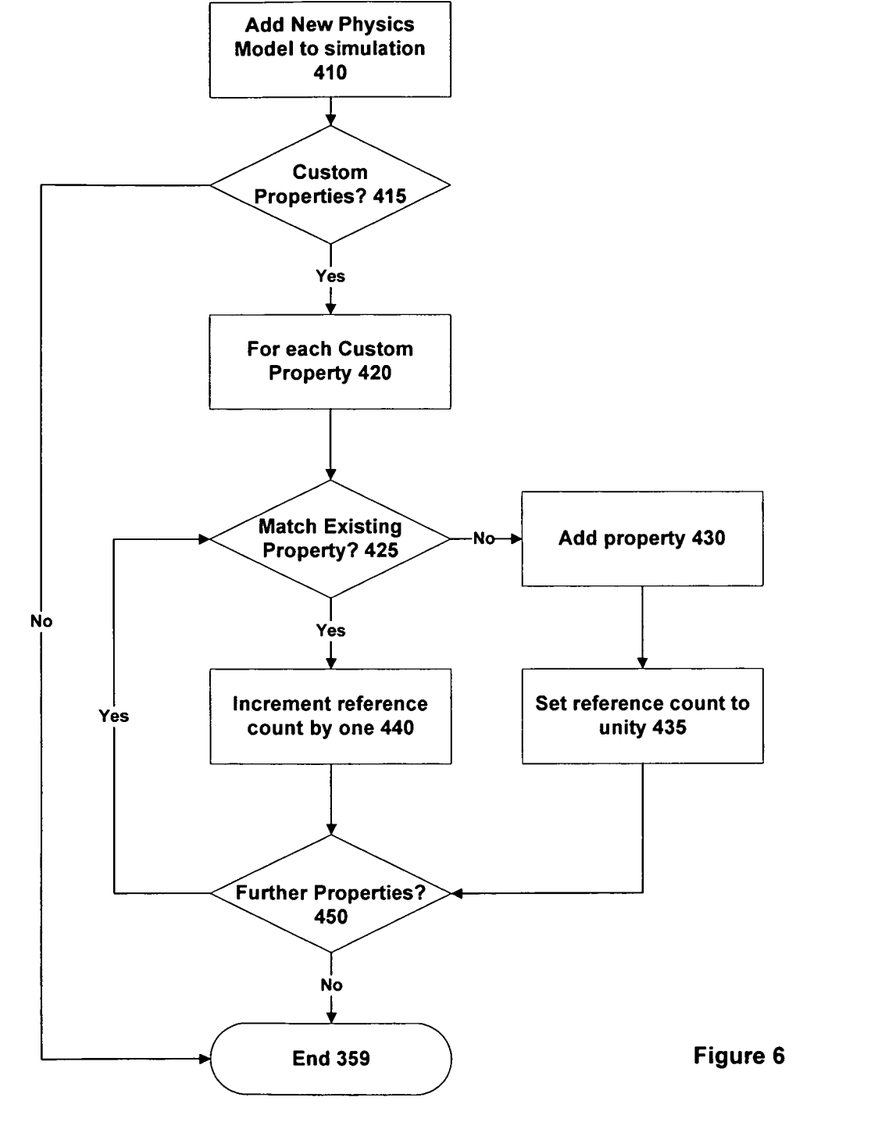
FIG. 6 is a flowchart showing certain aspects of adding a physics model into the simulation system in accordance with one embodiment of the invention.

FIGS. 5 and 6 are flowcharts illustrating the handling of system custom particle properties in accordance with one embodiment of the invention. The method of FIG. 5 commences with loading a new physics model plug-in 310, whereupon it is determined whether or not the new physics model includes any system custom particle properties 315. If not, the processing of FIG. 5 terminates at 349 with the new model being accepted. However, assuming that such custom particle properties are indeed present in the new physics model, the system examines each of the custom properties of the physics model in turn 320.

It is determined for each custom property whether it matches a particle property that is already present in the system 325. In the present embodiment, such a match is found if two properties have the same name. If no match is found, processing loops to investigate the next custom property (if any) 340. Alternatively, if a match is found with an existing property, a check is performed to see if there is a conflict with the existing property 330. If certain other fields of the property do not match those of the existing property (in the present embodiment, if data units and number of data elements are not the same), then an error is logged 335, and processing again loops to investigate the next custom property (if any) 340.

Once all the custom properties of the physics model have been investigated, a check is performed to see if any errors have been logged due to naming conflicts 345. If no such conflicts have been found, the new model is accepted 349. However, if a conflict has been found for any of the custom properties in the physics model, then the new model is not accepted 351.

FIG. 6 illustrates adding a new physics model into the system in accordance with one embodiment of the invention. At the start of FIG. 6, it is assumed that the processing of FIG. 5 has been completed successfully (end 349 rather than end 351), so that the new physics model can be added to the simulation 410. A test is now made to see if the new physics model has any custom properties 415; if not, processing terminates 359. (There may of course be other operations involved in adding a physic model to a system, but FIG. 6 only illustrates the processing of relevance to the custom particle properties).

On the other hand, if the new physics model does include custom properties, the system examines each of the custom properties of the physics model in turn 420. It is determined for each custom property whether it matches a particle property that is already present in the system 425. In the present embodiment, such a match is found if two properties have the same name. If there is a match, it can be assumed that the custom property of the new physics model is the same as the custom property already in the system (given the positive outcome from the processing of FIG. 5). The new physics model can therefore make use of this existing custom property (rather than adding any new property to the system). In doing so, a reference count for this custom property is incremented by one 440. This allows the system to keep track of how many physics models are making use of any given custom property. Processing now loops to investigate the next custom property (if any) 450.

Alternatively, if the test of 425 is negative, and the custom property does not already exist in the system, then the new custom property is added to the system 430. The reference count for this custom property is set to one 435, thereby indicating that only this physic model uses this custom particle property (for the present at least). Processing again loops to investigate the next custom property (if any) 450, and then terminates when all the custom properties have been completed 459.

Figure 7:
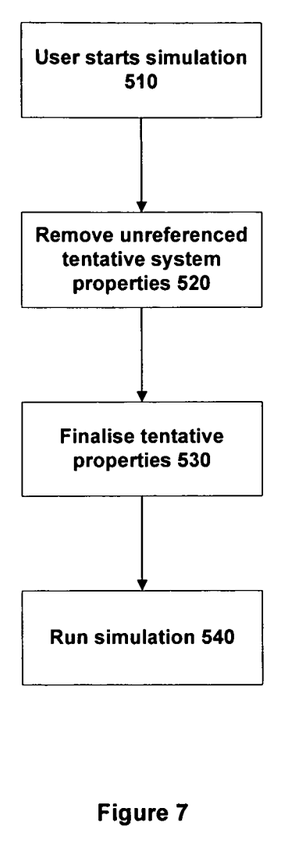
FIG. 7 is a flowchart showing certain aspects of running the simulation system with customised particle properties in accordance with one embodiment of the invention.

FIG. 7 illustrates the processing performed when a user starts to run a simulation in accordance with one embodiment of the invention. After the user requests processing to start 510, the system removes any unreferenced tentative system properties 520, i.e. system properties having a reference count of zero (all user properties have a reference count of 0 by definition and so are retained through this operation). All remaining tentative properties are now finalised 530. The finalisation procedure includes not only the new system custom properties, but also any user custom properties (such as entered via the graphical user interface shown in FIG. 4). As part of the finalisation procedure, the physics models are informed of the new custom particle properties for the simulation, and appropriate storage is allocated for holding the data values associated with these properties for each particle. The simulation is now run 540.

As previously indicated, after the custom particle properties have been added to the simulation system, it is generally then transparent to a user whether a particular property is a fixed property or a custom property. Thus the analysis tools 190 and associated portions of the graphical user interface 160 include both the fixed properties and custom properties when allowing a user to investigate the data—e.g. to plot the distribution of values for a particular property within the set of particles. In other words, if mass is a fixed property and temperature is a custom property, the user has the facility to produce a plot of particle mass distribution or particle temperature distribution (or both), according to the particular features of interest.

In addition, the particle factories 115 are extended to provide initial values for the custom properties as well as for the fixed properties. These initial values can be calculated for each new particle in accordance with a specified distribution (for both the custom properties and the fixed properties). Note however that when existing particles, such as particles saved from an earlier simulation, are to be used in subsequent stages of the simulation with the addition of new custom properties, in the present implementation these new properties are filled with the default value specified as part of the Custom Property Metadata (see Table 1), rather than using the factory distribution (since the particle factory 115 is not involved in the handling of existing particles but only the creation of new particles).

The approach described herein to support custom particle attributes (properties) provides the potential for DEM technology to track any desired variable through space and time, and for that variable to be made dynamically available to behaviour models for calculation and updating through time. Such an approach allows DEM technology to be readily extended with new capabilities and opens up the potential for many new applications within science and engineering, such as for the simulation of heat and mass transfer (e.g. in chemical and metals manufacturing), chemical, biochemical and biological reactions within and between discrete entities, objects or particles across a very wide range of size scale from nano-particle (nanometre) scale up to geological (kilometre) scale, and so on.

Although the approach described herein has focussed on support for customisable particle properties, there are other aspects of a DEM simulation where the ability to customise particles is also of benefit, for example entities defining the environment of the particles which are imported into the simulation and used in the behaviour models. These include solid and meshed geometry, mesh node and cell field data output from multi-body dynamics, fluid dynamics or electromagnetic simulation, and solid structural mesh data from finite element analysis. These additional customisable properties can be supported as appropriate, depending on the particular items concerned. For example, in the case of geometry elements representing a solid object other than a particle, one possible approach for entering custom properties for the geometry elements is to include such custom properties in the behaviour models that govern the interactions between particles and geometry elements, analogous to the approach for custom particle properties. Similarly, if the interaction of particles with a surrounding fluid is of interest, then one possible approach is to include custom properties referenced against the fluid field data elements to enable definition, storage and analysis of user defined variables calculated in behaviour models combining particle and fluid data deriving from coupled DEM and fluid flow simulation.

In conclusion, various embodiments of the invention have been described by way of example only, and having regard to particular environments and application requirements. The person of ordinary skill in the art will appreciate that many variations may be made to the particular implementations described herein without departing from the spirit and scope of the invention as defined by the appended claims.

What is claimed is:

1. A computer-implemented simulation method for discrete element modeling, said method comprising:
    providing a plurality of discrete elements, wherein each discrete element represents a separate, physical particle, and each discrete element stores a predefined set of properties specifying physical parameters of the particle represented by the discrete element;
    receiving at least one behaviour model for applying to the particles, the at least one behaviour model governing the interactions of a particle with other particles or with its environment, the at least one behaviour model including one or more user-defined properties to be assigned to the particles to supplement the predefined set of properties, wherein the one or more user-defined properties specify physical parameters used by the at least one behaviour model for determining particle interactions;
    in response to receipt of said one or more user-defined properties, adding said one or more user-defined properties to said discrete elements so that each discrete element stores both the predefined set of properties and the one or more user-defined properties; and
    performing a simulation of a flow of said particles using discrete element modeling, said simulation including:
        passing values for user-defined properties of the particles in the simulation to said at least one behaviour model;
        applying the at least one behaviour model to the particles, including utilising the user-defined properties for determining particle interactions; and
        updating the values of the predefined and user-defined properties stored in the particles based on the particle interactions determined by the at least one behaviour model.

2. The method of claim 1, wherein receiving the one or more user-defined properties includes:
    checking to see if a received user-defined property is already included in the simulation, and if not, adding the received user-defined property to the user-defined properties for use in the simulation.

3. The method of claim 2, wherein if the received user-defined property is already included in the simulation, arranging for the behaviour model containing the received user-defined property to use the user-defined property already included in the simulation, such that the same user-defined property can be used by multiple behaviour models.

4. The method of claim 3, wherein arranging for the behaviour model containing the received user-defined property to use the user-defined property already included in the simulation includes incrementing a reference count for the user-defined property already included in the simulation.

5. The method of claim 2, wherein if the received user-defined property is already included in the simulation, the method further comprises:

detecting a mismatch in one or more predetermined elements between the user-defined property and the property already included in the simulation; and responsive to the detection of a mismatch, flagging an error such that the received behaviour model including the mismatched user-defined property is not added to the simulation, along with any other user-defined properties of the behaviour model.

6. The method of claim 1, further comprising maintaining a data structure containing values of the user-defined properties for each particle.

7. The method of claim 6, further comprising maintaining a listing containing metadata for the user-defined properties.

8. The method of claim 7, wherein the metadata is used to access the values from said data structure.

9. The method of claim 6, wherein each discrete element corresponding to a particle includes a reference to the data structure containing the user-defined properties for the particle.

10. The method of claim 1, wherein the one or more received user-defined properties are initially set to a tentative state in which they may be amended, and are then finalised prior to performing the simulation.

11. The method of claim 10, wherein a finalised user-defined property cannot be amended or deleted.

12. The method of claim 1, wherein receiving the one or more user-defined properties includes allowing a user to enter a user-defined property by hand employing a graphical user interface.

13. The method of claim 1, wherein a behaviour model is removed from the simulation.

14. The method of claim 13, wherein removing a behaviour model from the simulation includes decrementing a reference count for a user-defined property included in the behaviour model.

15. The method of claim 14, further comprising deleting a user-defined property having a reference count of zero.

16. The method of claim 1, wherein said simulation comprises multiple types of particles, and said behaviour model applies to only a subset of the particle types.

17. A computer-implemented simulation system for discrete element modeling, said system comprising:

a plurality of discrete elements, wherein each discrete element representing a separate, physical particle, and each discrete element stores a predefined set of properties specifying physical parameters of the particle represented by the discrete element; and an interface in a computer for receiving at least one behaviour model for applying to the particles, the at least one behaviour model governing the interactions of a particle with other particles or with its environment, said interface supporting receipt from the at least one behaviour model of one or more user-defined properties to be assigned to the particles to supplement the predefined set of properties, wherein the one or more user-defined properties specify physical parameters used by the at least one behaviour model for determining particle interactions;

wherein said system is responsive to receipt of said one or more user-defined properties to add said one or more user-defined properties to said discrete elements so that each discrete element stores both the predefined set of properties and the one or more user-defined properties for the particles; and wherein said system is operable to perform a simulation of a flow of particles using discrete element modeling, said simulation including:

passing values for user-defined properties of the particles in the simulation to said at least one behaviour model;

applying the at least one behaviour model to the particles, including utilising the user-defined properties for determining particle interactions; and updating the values of the predefined and user-defined properties stored in the particles based on the particle interactions determined by the at least one behaviour model.

18. A non-transitory computer-readable storage medium storing program instructions for execution by one or more computers to implement a simulation method for discrete element modeling, said method comprising:

providing a plurality of discrete elements, wherein each discrete element represents a separate, physical particle, and each each discrete element stores a predefined set of properties specifying physical parameters of the particle represented by the discrete element;

receiving at least one behaviour model for applying to the particles, the at least one behaviour model governing the interactions of a particle with other particles or with its environment, the at least one behaviour model including one or more user-defined properties to be assigned to the particles to supplement the predefined set of properties, wherein the one or more user-defined properties specify physical parameters used by the at least one behaviour model for determining particle interactions;

in response to receipt of said one or more user-defined properties, adding said one or more user-defined properties to said discrete elements so that each discrete element stores both the predefined set of properties and the one or more user-defined properties; and performing a simulation of a flow of said particles using discrete element modeling, said simulation including:

passing values for user-defined properties of the particles in the simulation to said at least one behaviour model;

applying the at least one behaviour model to the particles, including utilising the user-defined properties for determining particle interactions; and updating the values of the predefined and user-defined properties stored in the particles based on the particle interactions determined by the at least one behaviour model.

\* \* \* \* \*